Patented Apr. 5, 1932

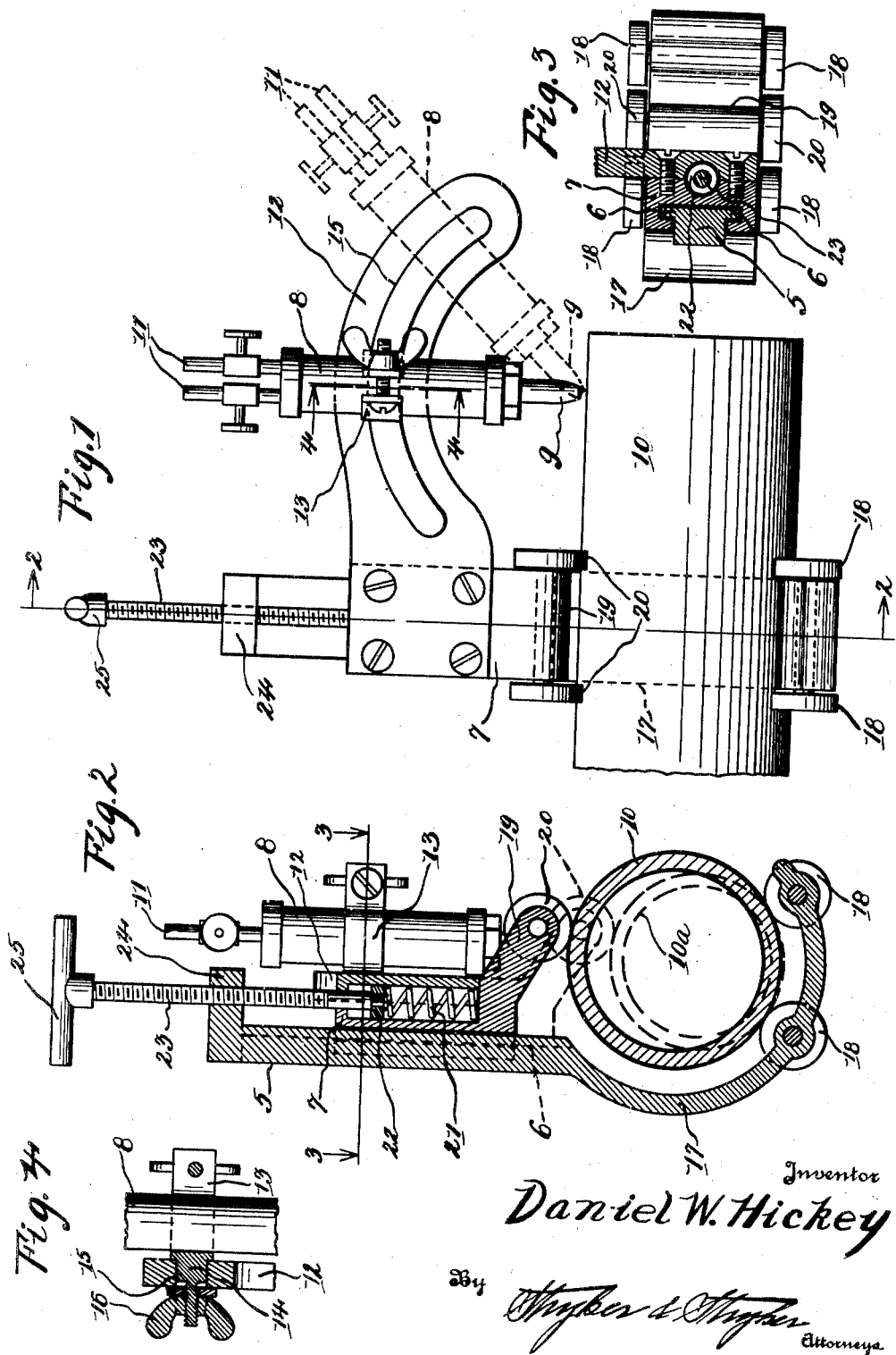

1,852,413

UNITED STATES PATENT OFFICE

DANIEL W. HICKEY, OF ST. PAUL, MINNESOTA

PIPE-CUTTING TORCH SUPPORT

Application filed July 26, 1930. Serial No. 471,053.

It is my object to provide novel means for quickly and easily cutting pipes by burning.

More particularly, it is my object to provide an unusually simple and inexpensive carriage for supporting a torch in position to cut pipe perpendicularly relative to the pipe axis and with beveled end surfaces. The invention also includes certain other novel features of construction whereby attachment of the device to the pipe is facilitated and the device is adapted to be applied to pipe of various sizes.

Referring to the accompanying drawings, which illustrate the best form of my device at present known to me, Figure 1 is a side elevation of the device mounted on the pipe; Fig. 2 is a transverse section taken on the line 2—2 of Fig. 1; Fig. 3 is a fragmentary section taken on the line 3—3 of Fig. 2 and Fig. 4 is a fragmentary section taken on the line 4—4 of Fig. 1.

I provide a frame, indicated generally by the numeral 5, and at one side of this frame, to provide a guide extending in a direction transverse the pipe to be cut, guide flanges 6 project to engage in a longitudinal groove formed in a support 7 for a torch 8. The torch illustrated is of the oxyacetylene type having a burner tip 9 for directing the flame against the pipe 10. Connections 11 are provided for supplies of oxygen and gas to be burned. A bracket arm 12 projects longitudinally of the pipe 10 and is rigidly secured to the support 7 as clearly shown in Fig. 1. A suitable clamp 13 engages the torch 8 and has a stud 14, square in cross section, projecting in an arcuate slot 15 in the arm 12. The end of the stud 14 which projects through the slot 15 is threaded to receive a wing nut 16 for securing the stud at any selected point in the arcuate slot.

Projecting from one end of the frame 5 is an arcuate arm 17 adapted to extend part way around the pipe 10 and having pairs of wheels 18 journaled therein to engage the periphery of the pipe. Journaled in a rigid projection 19 on the support 7 is another pair of wheels 20 adapted to engage the pipe 10 at its periphery opposite the rollers 18. These wheels 20 are movable with the support 7 along the guide flanges 6 and are urged against the pipe by a coiled spring 21 in a suitable recess in the support 7. At its upper end, as seen in Fig. 2, the spring 21 abuts against a head 22 on a threaded rod 23. This rod has a threaded engagement with a bearing 24 formed in the frame and is adapted to be turned by handle 25.

In use, to apply the carriage to a pipe 10, it is only necessary to retract the support 7 toward the bar 24 by turning the screw 23 and then place the rollers 18 in engagement with the pipe and finally move the support 7 toward the pipe by turning the screw until the wheels 20 engage the periphery and the spring 21 is under the desired compression. Now, with the torch 8 in operation and adjusted so that its tip 9 is at proper distance from the periphery of the pipe for burning, the device may be rotated around the pipe to cut it substantially in a plane perpendicularly to its axis. During the rotation of the torch relative to the pipe the tip 9 is maintained at the proper distance from the pipe irrespective of irregularities in the pipe surface. The spring 21 permits the necessary compensating movement and retains the support 7 for the torch in proper relation to the pipe to be cut.

If a beveled and surface is desired on the pipe the torch 8 may be moved to an angular position, such as that indicated in dotted lines Fig. 1, by merely manipulating wing nut 16 and sliding the stud 14 to the desired position in arcuate slot 15.

My device may be applied to pipes of different sizes with a minimum of adjustment. For example, if a smaller pipe 10a is to be cut the screw 23 is merely advanced a greater distance through the bearing 24 to bring the wheels 20 firmly against the smaller pipe.

The cost of the device has been reduced to a minimum, but notwithstanding its low cost and simplicity, pipes with either straight or beveled ends may be cut with great rapidity. Further, where pipes of different sizes are cut a minimum of time is consumed in making adjustments for this purpose.

Having described my invention, what I claim as new and desire to protect by Letters Patent is:

1. A torch carriage comprising a frame, anti-friction means on said frame for engaging the periphery of a pipe, a support for a torch movable toward the pipe on said frame, anti-friction means on said support to engage the periphery of the pipe, resilient means for urging said support toward the pipe and means for securing a torch to said support.

2. A torch carriage comprising a frame, a plurality of wheels on said frame for engaging the periphery of a pipe to be cut, a support for a torch movable toward the pipe on said frame, a wheel on said support to engage the periphery of the pipe opposite said first mentioned wheels, means for urging said support toward the pipe whereby said wheel on the support is maintained in rolling contact with said pipe and means for securing a torch to said support.

3. A torch carriage comprising a frame, an arcuate arm projecting from said frame to extend part way around a pipe, anti-friction means on said arm for engaging the periphery of a pipe, a support for a torch movable toward the pipe on said frame, a wheel on said support to engage the periphery of the pipe opposite said arm, means for urging said support toward the pipe and means for securing a torch to said support.

4. A torch carriage comprising a frame, a guide on said frame for a torch, said guide extending transverse a pipe to be cut, means on said frame to movably engage the outer periphery of said pipe, a support for a torch slidable along said guide, a guide element on said support to movably engage the periphery of the pipe, means for maintaining said guide element in contact with the pipe, means for securing a torch to said support and manually operable means for moving said support along said guide.

5. A torch carriage comprising a frame, anti-friction means on said frame for engaging the periphery of a pipe, a guide projecting transverse the pipe, a support for a torch slidable along said guide, means on said support to engage the periphery of the pipe opposite said anti-friction means, a coiled spring on said support for urging said support toward the pipe, means for securing a torch to said support and manually operable means for compressing said spring and thereby resiliently advancing said support along said guide.

6. A torch carriage comprising a frame, an arcuate arm projecting from said frame to extend part way around the pipe, anti-friction means on said arm for engaging the periphery of a pipe, a guide projecting transverse the pipe, a support for a torch slidable along said guide, means on said support to engage the periphery of the pipe opposite said anti-friction means, means for urging said support toward the pipe, means for securing a torch to said support and manually operable means for moving said support along said guide.

7. A torch carriage comprising a frame, anti-friction means on said frame for engaging the periphery of a pipe, a support for a torch movable toward the pipe on said frame, anti-friction means on said support to engage the periphery of the pipe, resilient means for urging said support toward the pipe, a bracket projecting longitudinally of the pipe from said support, means for securing a torch to said bracket in oblique positions relative to the axis of the pipe for forming beveled ends on pipe and manually operable means for moving said support on said frame.

8. A torch carriage comprising a frame, anti-friction means on said frame for engaging the periphery of a pipe, support for a torch movable toward the pipe on said frame, anti-friction means on said support to engage the periphery of the pipe, a coiled spring on said support for urging said support toward the pipe, a bracket projecting longitudinally of the pipe from said support, means for securing a torch to said bracket in oblique positions relative to the axis of the pipe for forming beveled ends on pipe and a manually operable rod screw threaded in the frame and engaging said spring to actuate said support to and from the pipe.

In testimony whereof I have hereunto signed my name to this specification.

DANIEL W. HICKEY.